(12) United States Patent
Yu

(10) Patent No.: US 10,516,666 B2
(45) Date of Patent: Dec. 24, 2019

(54) AUTHENTICATION METHOD, APPARATUS, AND SYSTEM

(71) Applicant: ALIBABA GROUP HOLDING LIMITED, George Town, Grand Cayman (KY)

(72) Inventor: Wenlong Yu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/206,116

(22) Filed: Jul. 8, 2016

(65) Prior Publication Data
US 2017/0012976 A1    Jan. 12, 2017

(30) Foreign Application Priority Data

Jul. 8, 2015 (CN) .......................... 2015 1 0398610

(51) Int. Cl.
*H04L 29/06* (2006.01)
(52) U.S. Cl.
CPC .............................. *H04L 63/0876* (2013.01)
(58) Field of Classification Search
CPC ... H04L 63/08; H04L 63/0876; H04L 63/083; H04L 63/10; H04L 61/2007; G06F 21/44
See application file for complete search history.

(56) References Cited

U.S. PATENT DOCUMENTS

| 5,537,474 A | 7/1996 | Brown et al. |
| 6,895,511 B1 * | 5/2005 | Borsato .................. H04L 29/06 726/5 |
| 7,512,796 B2 | 3/2009 | Haverinen et al. |
| 8,166,524 B2 | 4/2012 | Sentinelli |
| 2004/0076128 A1 | 4/2004 | Rao et al. |

(Continued)

FOREIGN PATENT DOCUMENTS

| CN | 103986584 A | 8/2014 |
| CN | 104410622 A | 3/2015 |

(Continued)

OTHER PUBLICATIONS

PCT International Search Report and Written Opinion dated Nov. 7, 2016, issued in corresponding International Application No. PCT/US16/41609 (11 pages).

(Continued)

*Primary Examiner* — Christopher C Harris
(74) *Attorney, Agent, or Firm* — Finnegan, Henderson, Farabow, Garrett & Dunner, LLP

(57) ABSTRACT

An authentication method is provided. The authentication method includes receiving a login request from a client terminal. The login request may be generated based on an identification feature of the client terminal, and the login request may include account information associated with the client terminal. The method may further include identifying the identification feature based on the login request, determining whether a database associated with a server includes the identification feature and the account information, generating login status information based on a result of the determination and sending the login status information to the client terminal, and if the login status information indicates a login success of the client terminal, initiating data communications with the client terminal.

19 Claims, 6 Drawing Sheets

(56) References Cited

U.S. PATENT DOCUMENTS

| | | |
|---|---|---|
| 2004/0205211 A1 | 10/2004 | Takeda et al. |
| 2004/0236964 A1 | 11/2004 | Haverinen |
| 2005/0210251 A1 | 9/2005 | Nyberg et al. |
| 2005/0289640 A1* | 12/2005 | Tanaka .................... G06F 21/31 726/3 |
| 2006/0080542 A1* | 4/2006 | Takeuchi ................ G06F 21/33 713/182 |
| 2006/0117104 A1 | 6/2006 | Taniguchi et al. |
| 2007/0056022 A1* | 3/2007 | Dvir ........................ G06F 21/31 726/4 |
| 2008/0066168 A1* | 3/2008 | Gregg ................... G06F 21/335 726/7 |
| 2008/0162926 A1 | 7/2008 | Xiong et al. |
| 2009/0158392 A1* | 6/2009 | Hughes .................. H04L 63/08 726/3 |
| 2009/0217033 A1 | 6/2009 | Costa et al. |
| 2009/0300744 A1 | 12/2009 | Guo et al. |
| 2012/0323717 A1 | 12/2012 | Kirsch |
| 2013/0074164 A1 | 3/2013 | Bartlett |
| 2013/0212653 A1* | 8/2013 | Hoghaug ................ G06F 21/34 726/5 |
| 2015/0088710 A1 | 3/2015 | Short et al. |

FOREIGN PATENT DOCUMENTS

| | | |
|---|---|---|
| EP | 1478204 A2 | 11/2004 |
| WO | WO 2007/038896 A2 | 4/2007 |

OTHER PUBLICATIONS

Extended European Search Report, pursuant to Rule 62 EPC, the supplementary European Search Report (Art. 153(7) EPC) and the European Search Report dated Jun. 20, 2018 (7 pgs.).

SIPO First Chinese Search Report issued in corresponding Chinese Application No. 2015103986106 dated Mar. 6, 2019 (1 page).

SIPO First Chinese Office Action issued in corresponding Chinese Application No. 2015103986106 dated Apr. 1, 2019 (18 pages).

\* cited by examiner

AUTHENTICATION METHOD, APPARATUS, AND SYSTEM

CROSS-REFERENCE TO RELATED APPLICATION

This application is based upon and claims priority to Chinese Patent Application No. 201510398610.6, filed Jul. 8, 2015, the entire contents of which are incorporated herein by reference.

TECHNICAL FIELD

The present application relates to the field of communications technology and, more particularly, to an authentication method, apparatus, and system.

BACKGROUND

With the widespread usage of smart terminals, applications installed on the smart terminals have gained tremendous popularity among users. To access an application installed on a smart terminal, a user is often required to first log into a corresponding server, where the server may authenticate the terminal and verify whether the user is authorized to access the system. In the conventional circuit switch communication system with TCP-based connections, a Simple Authentication and Security Layer (SASL) authentication framework is typically used for authentication.

SASL is a mechanism for providing authentication and data security service. In order to use the SASL framework, both a server and a client terminal would need to install a libsasl library, and the client terminal is required to support at least one of the SASL mechanisms provided by the server, including DIGEST-MD5, CRAM-MD5, LOGIN, and PLAIN. When the application only services a single local user, authentication may not be required. But when the application services more than one user or is open to other users on a network (e.g., through a cloud service), the SASL authentication mechanism may be required, and the client terminal may be required to install the libsasl library in order to support SASL. Because the installation of the libsasl library is a relatively complex and error-prone process not easily performed by the average user, the SASL framework is less than ideal. For example, to gain full access to all of the services provided by the memcached protocol, a PHP client terminal may be required to manually install the libsasl library. If the client terminal cannot install or support the libsasal library, or if the user at the client terminal is incapable of doing so, the client terminal may not be able to access some or any of the services offered by the memcached protocol. Neither situation is desirable.

Thus, the conventional authentication schemes are inconvenient in that they require a client terminal to support SASL. Also, a user may not wish to be burdened by the technical details of authentication when using an application. Thus, it is desirable to provide an authentication scheme that allows the client terminal to authenticate with the server without using the SASL mechanism.

SUMMARY

The present disclosure provides an authentication method. Consistent with some embodiments, the authentication method includes receiving a login request from a client terminal. The login request may be generated based on an identification feature of the client terminal, and the login request may include account information associated with the client terminal. The authentication method may further include identifying the identification feature based on the login request, determining whether a database associated with a server includes the identification feature and the account information, generating login status information based on a result of the determination and sending the login status information to the client terminal, and if the login status information indicates a login success of the client terminal, initiating data communications with the client terminal.

Consistent with some embodiments, this disclosure provides an authentication apparatus. The authentication apparatus includes a receiving unit configured to receive a login request from a client terminal. The login request may be generated based on an identification feature of the client terminal, and the login request may include account information associated with the client terminal. The authentication apparatus may further include an identification unit configured to identify the identification feature based on the login request, a determination unit configured to determine whether a database associated with a server includes the identification feature and the account information, a generating unit configured to, generate login status information based on a result of the determination and send the login status information to the client terminal, and an establishing unit configured to, if the login status information indicates a login success of the client terminal, initiate data communications with the client terminal.

Consistent with some embodiments, this disclosure provides a method for accessing a server. The method includes obtaining an identification feature of a client terminal and generating a login request based on the identification feature and sending the login request to the server. The login request may include account information associated with the client terminal. The method may further include receiving login status information from the server and if the login status information indicates a login success of the client terminal, initiating data communications with the server. The login status information may be generated by the server based on the login request.

Consistent with some embodiments, this disclosure provides an apparatus for accessing a server. The apparatus includes an obtaining unit configured to obtain an identification feature of a client terminal and a generating unit configured to generate a login request based on the identification feature and send the login request to the server. The login request may include account information associated with the client terminal. The apparatus may further include a receiving unit configured to receive login status information from the server and an establishing unit configured to, if the login status information indicates a login success of the client terminal, initiate data communications with the server. The login status information may be generated by the server based on the login request.

Consistent with some embodiments, this disclosure provides an authentication system. The authentication system includes the authentication apparatus and the apparatus for accessing a server described above.

Consistent with some embodiments, this disclosure provides an electronic device. The electronic device includes a display, a processor, and a memory configured to store instructions executable by the processor. The processor may be configured to receive a login request from a client terminal. The login request may be generated based on an identification feature of the client terminal, and the login request may include account information associated with the client terminal. The processor may be further configured to determine whether a database of a server includes the identification feature and the account information, generate login status information based on a result of the determination and send the login status information to the client terminal, and if the login status information indicates a login success of the client terminal, initiate data communications with the client terminal.

Consistent with some embodiments, this disclosure provides a non-transitory computer readable medium that stores a set of instructions that are executable by at least one processor of a server to cause the server to perform an authentication method. The authentication method includes receiving a login request from a client terminal. The login request may be generated based on an identification feature of the client terminal, and the login request may include account information associated with the client terminal. The authentication method may further include identifying the identification feature based on the login request, determining whether a database associated with the server includes the identification feature and the account information, generating login status information based on a result of the determination and sending the login status information to the client terminal, and if the login status information indicates a login success of the client terminal, initiating data communications with the client terminal.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Consistent with some embodiments of this disclosure, a client terminal may generate a login request based on an identification feature of the client terminal, such as an IP address of the client terminal, and send the login request to the server. In doing so, the SASL authentication mechanism may be avoided.

The disclosed embodiments, however, are not intended to be limited to using an IP address of the client terminal as the identification feature of the client terminal, as other unique identifying features of the client terminal may be used without departing from the scope of the present disclosure. For example, the client terminal may use a Medium Access Control (MAC) address of the client terminal to generate the login request, where the MAC address identifies the Local Area Network (LAN) node and is a globally unique address for the client terminal. The MAC address may be hard coded into an Erasable Programmable Read-Only Memory (EPROM) of the network card (e.g., a flash memory chip that is usually rewritable by program) during manufacturing, which stores the address identifying the host computer transmitting and receiving data in data transmission. The MAC address may identify the host computer during the physical transmission of data in a network infrastructure.

Figure 1:
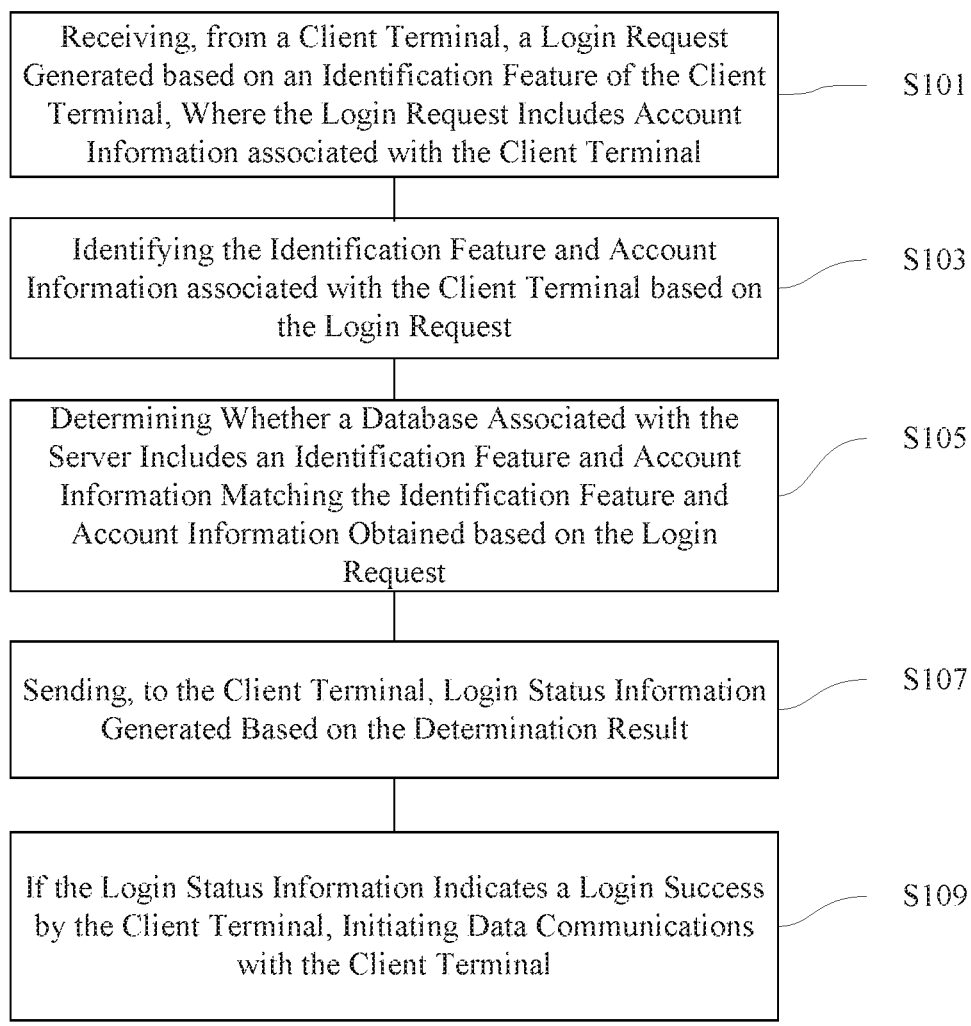
FIG. 1 is a flowchart of an exemplary authentication method, consistent with some embodiments of this disclosure.

FIG. 1 is a flowchart of an exemplary authentication method 100, consistent with some embodiments of this disclosure. The exemplary method 100 may be performed by a server, which determines whether the client device is allowed to access the server based on the login request described above. Referring to FIG. 1, the method 100 includes the following steps.

In step S101, the server receives, from a client terminal, a login request generated based on an identification feature of the client terminal, where the login request includes account information associated with the client terminal. The account information may include an account name or a user name input by a user in the client terminal.

In some embodiments, the identification feature of the client terminal may include an Internet Protocol (IP) address of the client terminal. The Internet Protocol is a set of rules designed to enable computer networks to connect and communicate with each other on the Internet. An IP address is an identification code on the Internet, and each PC on the network has an IP address in order to communicate with others on the network. In some embodiments, other unique identification features of the client terminal may be used in step S101. For example, a MAC address of the client terminal may be used as the identification feature.

In some implementations, the server may also receive one or more data packets sent by the client terminal when receiving the login request. This may occur when a user performs operations at the client terminal before the server receives the login request sent from the client terminal.

After receiving the login request and the data packets, the server may not be able to immediately process the login request and the data packets. For example, when an exception occurs in executing a thread, other operations of the thread may wait for a response and may not be executed before a response is received. As another example, the login request may be corrupted during network transmission when being sent to the server, and the server may need to execute the login request in another thread. Thus, in some implementations, the server may mark the authentication status of the login request and data packets as pending authentication.

In some embodiments, the server may receive a binding request from the client terminal before receiving the login request, such that the server may generate information for comparison with the login request. This is further described in connection with sub-steps S100-1 to S100-3.

In step S100-1, the server may receive a binding request from the client terminal.

In step S100-2, the server may identify an identification feature and account information of the client terminal based on the binding request. The account information may include an account name or a user name associated with the client terminal. The identification feature may include the IP address of the client terminal.

In step S100-3, the server may establish a mapping relationship between the identification feature and the account information of the client terminal. For example, the server may store the IP address and the account name associated with the client terminal in a SASL database, and generate a mapping relationship between the IP address and the account name.

Returning to FIG. 1, in step S103, the server identifies the identification feature and account information associated with the client terminal based on the login request. For example, the server may parse a received data message to obtain the identification feature and account information associated with the client terminal.

In step S105, the server determines whether a database associated with the server includes an identification feature and account information matching the identification feature and account information obtained from the login request. For example, the server may perform an asynchronous operation and search the SASL database for the matching identification feature and account information. The server may also query for the matching account information in the SASL database. If matching account information exists in the database, the server may obtain the corresponding IP address mapped to the account information and compare the corresponding IP address with the IP address of the client terminal to determine whether they are the same.

In step S107, the server sends, to the client terminal, login status information generated based on the determination result of S105. For example, if the SASL database includes the matching identification feature and account information of the client terminal, login status information indicating a login success by the client terminal may be generated and sent. If the SASL database does not include matching identification feature and account information of the client terminal, login status information indicating a login failure by the client terminal may be generated and sent. In some implementations, if the SASL database includes the matching identification feature and account information of the client terminal, the server may also change the authentication status of the data packets and login request to authenticated. The server may perform a processing operation on the data packets after modifying the authentication status of the data packets and login request to authenticated.

In step S109, if the login status information indicates a login success by the client terminal, the server initiates data communications with the client terminal and the client terminal may access the database in the server. In some implementations, the server may mark the authentication status of the data packets received after the server initiates data communications with the client as authenticated and may perform processing operations on the data packets.

Figure 2:
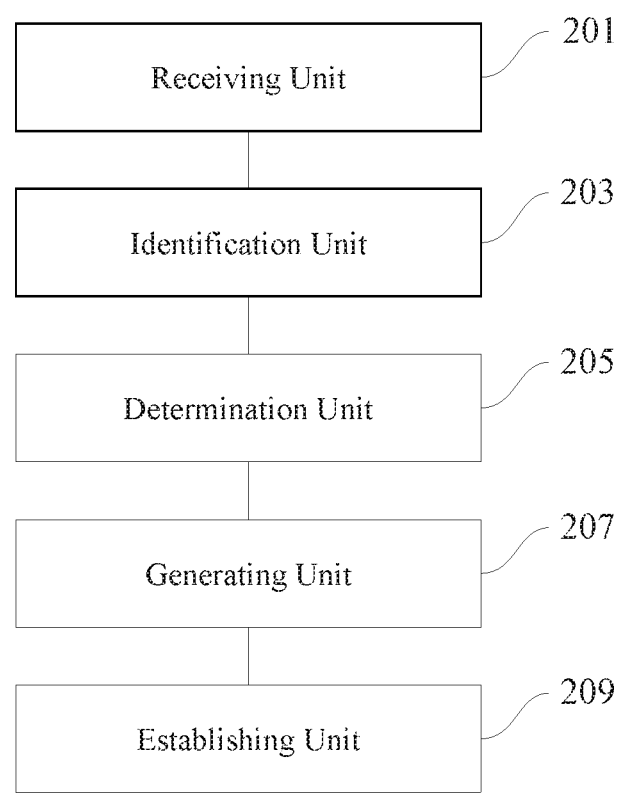
FIG. 2 is a block diagram of an exemplary authentication apparatus, consistent with some embodiments of this disclosure.

FIG. 2 is a block diagram of an exemplary authentication apparatus 200, consistent with some embodiments of this disclosure. The authentication apparatus 200 may be implemented as a part or all of a server. Referring to FIG. 2, the authentication apparatus 200 includes a receiving unit 201, an identification unit 203, a determination unit 205, a generating unit 207, and an establishing unit 209.

The receiving unit 201 is configured to receive, from a client terminal, a login request generated based on an identification feature of the client terminal, where the login request includes account information associated with the client terminal.

The identification unit 203 is configured to identify the identification feature and account information associated with the client terminal based on the login request.

The determination unit 205 is configured to determine whether the server database includes an identification feature and account information matching the identification feature and account information identified by the identification unit 203.

The generating unit 207 is configured to generate login status information based on the determination result of the determination unit 205 and send the login status information to the client terminal.

The establishing unit 209 is configured to cause the server to initiate data communications with the client terminal if the login status information generated by the generating unit 207 indicates a login success by the client terminal.

In some embodiments, the receiving unit 201 may be configured to receive an IP address of the client terminal. The receiving unit 201 may be further configured to receive one or more data packets sent by the client terminal.

In some embodiments, the receiving unit 201 may further include a first status marking sub-unit configured to mark the authentication status of the login request and data packets received from the client terminal as pending authentication.

In some embodiments, the determination unit 205 may be configured to perform an asynchronous operation and search the SASL database for the matching identification feature and account information.

In some embodiments, the authentication apparatus 200 may further include a status modifying unit configured to change the authentication status of the data packets and login request to authenticated if the determination unit 205 determines that the database of the server includes the matching identification feature and account information. The status modifying unit may further include a processing sub-unit configured to process the data packets sent by the client terminal after modifying the authentication status of the data packets as authenticated.

In some embodiments, the authentication apparatus 200 may further include a second status marking unit configured to mark the authentication status of data packets received from the client terminal after the server initiates data communication with the client terminal as authenticated.

In some embodiments, the authentication apparatus 200 may further include a binding request receiving unit, a binding request identification unit, and a mapping unit.

The binding request receiving unit may be configured to receive a binding request sent by the client terminal. The binding request identification unit may be configured to identify an identification feature and account information associated with the client terminal based on the binding request. The mapping unit may be configured to generate a mapping relationship between the identification feature and the account information of the client terminal and store the mapping relationship in, for example, a SASL database.

Figure 3:
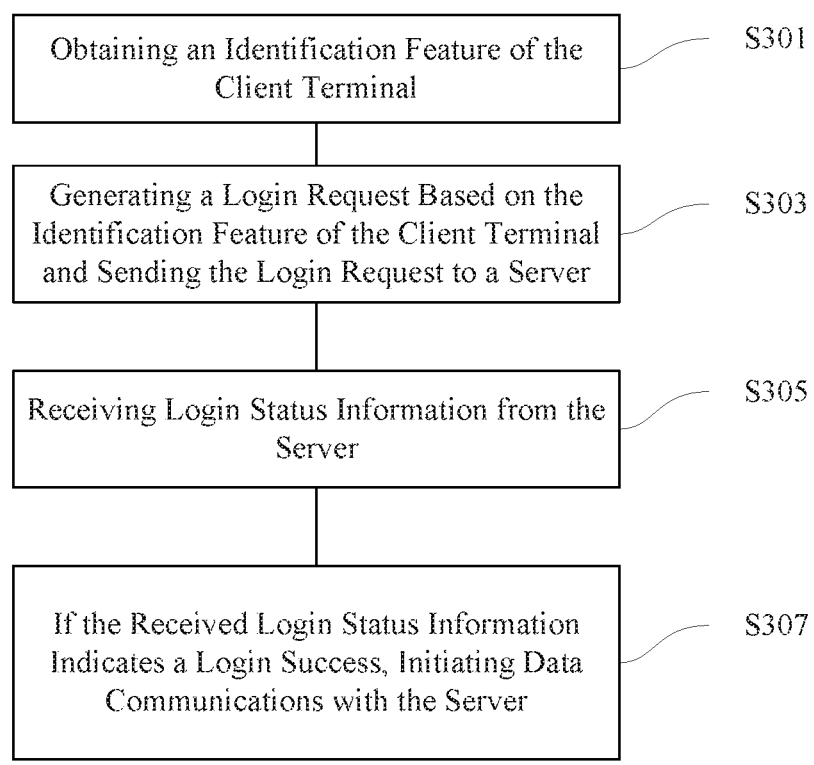
FIG. 3 is a flowchart of an exemplary method for accessing a server performed by a client terminal, consistent with some embodiments of this disclosure.

FIG. 3 is a flowchart of an exemplary method 300 for accessing a server, consistent with some embodiments of this disclosure. The method 300 may be performed by a client terminal. Referring to FIG. 3, the method 300 includes the following steps.

In step S301, the client terminal obtains an identification feature of the client terminal. For example, the client terminal may obtain an IP address of the client terminal as the identification feature. As another example, the client terminal may obtain a MAC address of the client terminal as the identification feature. In some implementations, the client terminal may obtain the identification feature based on an interface provided by the client terminal, such as using the getIpAddr class.

In some embodiments, the client terminal may send a binding request to the server before sending the login request, such that the server may generate information for comparison with the login request. In some embodiments, the server may require the client terminal to send a binding request before sending a login request in order to generate information for comparison with the login request.

The method 300 may further include sub-steps S300-1 to S300-3, described as follows.

In step S300-1, the client terminal may receive account information input from a user. In some implementations, the account information may be entered through a text box displayed on the client terminal. A virtual keyboard may be displayed on the display screen to receive a virtual keyboard touch operation by the user or account information input from an external device. For example, a user may input text "abcd" in the client terminal as the account name.

In step S300-2, the client terminal may obtain an identification feature of the client terminal when the account information is received at the client terminal. For example, the client terminal may obtain the IP address of the client terminal, and/or other identification feature of the client terminal, such as the MAC address of the network card, when the account information is received at the client terminal.

In step S300-3, the client terminal may generate a binding request based on the identification feature obtained in step S300-2 and send the binding request to the server. For example, the client terminal may send the binding request to the server in a data message according to an application layer protocol. The client terminal may generate a binding request in response to a request from the server or in accordance with protocol.

In step S303, the client terminal generates a login request based on the identification feature of the client terminal and sends the login request to a server, where the login request includes the account information associated with the client terminal. For example, the client terminal may obtain the IP address of the client terminal locally, include the account information and the IP address in the login request, and send the login request to the server. The account information may include the account name or user name provided in the client terminal by the user. The client terminal may send the login request to the server in a data message according to an application layer protocol. In this disclosure, a data message refers to a data unit in network switching and transmission, e.g., a data block that is to be transmitted in a single unit. The data message may include the entire or a portion of the data packet to be transmitted, and the length of the data message may be variable. The application layer protocol may be a connection-based protocol, such as a Transmission Control Protocol (TCP) protocol, a Memcached protocol, or the like.

In some implementations, the client terminal may include one or more data packets in the login request to send to the server. This may occur when a user has already been operating at the client terminal before the client terminal sends a login request to the server.

In step S305, the client terminal receives login status information from the server. For example, if the authentication of the login request is successful, the client terminal may receive login status information indicating a login success from the server. If the authentication of the login request is unsuccessful, the client terminal may receive login status information indicating a login failure from the server.

In step S307, if the received login status information indicates a login success, the client terminal begins data communications with the server. The client terminal may access the database in the server thereafter.

Figure 4:
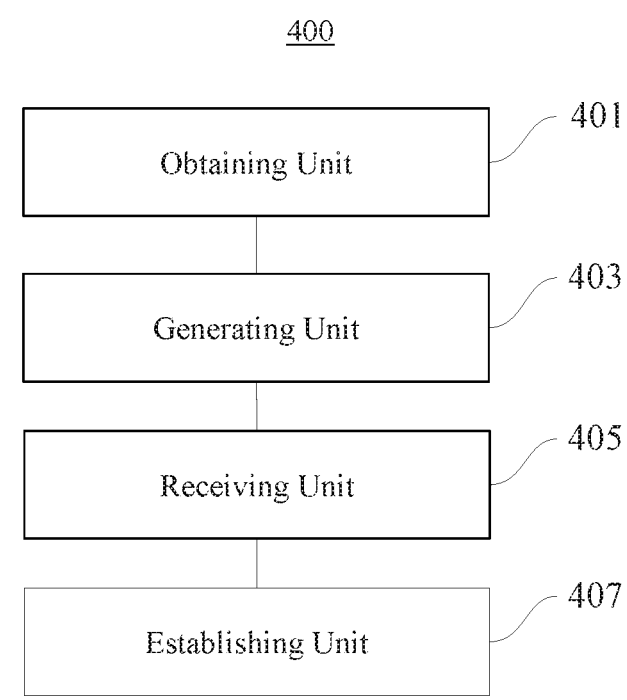
FIG. 4 is a block diagram of an exemplary apparatus for accessing a server, consistent with some embodiments of this disclosure.

FIG. 4 is a block diagram of an exemplary apparatus 400 for accessing a server, consistent with some embodiments of this disclosure. The apparatus 400 may be implemented as a part or all of a client terminal. Referring to FIG. 4, the apparatus 400 includes an obtaining unit 401, a generating unit 403, a receiving unit 405, and an establishing unit 407.

The obtaining unit 401 is configured to obtain an identification feature of the client terminal.

The generating unit 403 is configured to generate a login request based on the identification feature of the client terminal and send the login request to a server, where the login request includes the account information associated with the client terminal.

The receiving unit 405 is configured to receive login status information from the server.

The establishing unit 407 is configured to initiate data communications with the server if the login status information received by the receiving unit 405 indicates a login success.

In some embodiments, the obtaining unit 401 may be configured to obtain an IP address of the client terminal.

In some embodiments, the generating unit 403 may be configured to transmit the login request to the server in a data message according to an application layer protocol, such as a TCP protocol. In some embodiments, the generating unit 403 may further include a packet sub-unit configured to send one or more data packets to the server.

In some embodiments, the apparatus 400 may further include an account information receiving unit, an acquiring unit, and a binding request generation unit (not shown). The account information receiving unit may be configured to receive account information provided by the client terminal, before the obtaining unit 401 obtains the identification feature of the client terminal. The acquiring unit may be configured to acquire the identification feature of the client terminal when the account information receiving unit receives the account information. The binding request generating unit may be configured to include the identification feature acquired by the acquiring unit and the account information received by the account information receiving unit in a binding request and send the binding request to the server.

Figure 5:
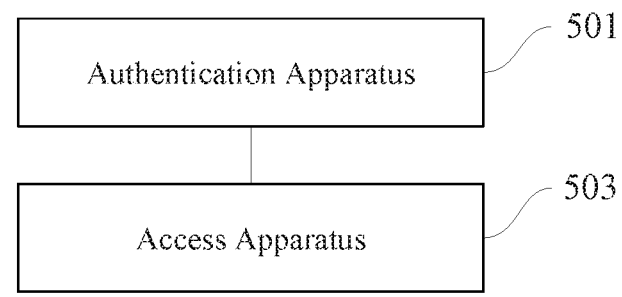
FIG. 5 is a block diagram of an exemplary authentication system, consistent with some embodiments of this disclosure.

FIG. 5 is a block diagram of an exemplary authentication system 500, consistent with some embodiments of this disclosure. Referring to FIG. 5, the authentication system 500 includes an authentication apparatus 501 and an access apparatus 503. The authentication apparatus 501 may be implemented as a part or all of a server, and access apparatus 503 may be implemented as a part or all of a client terminal.

The authentication apparatus 501 is configured to receive, from the access apparatus 503, a login request generated based on an identification feature of the client terminal, and to determine whether the client terminal is allowed to perform data communications with the server.

The access apparatus 503 is configured to obtain an identification feature of the client terminal, generate a login request based on the identification feature of the client terminal and send the login request to the authentication apparatus 501, and initiate data communications with the server based on login status information received from the server.

In some embodiments, the authentication system 500 may perform an authentication process including steps as follows.

In step 1, the access apparatus 503 receives account information entered from the client terminal.

In step 2, the access apparatus 503 obtains a first identification feature of the client terminal while receiving the account information.

In step 3, the access apparatus 503 includes the account information and first identification feature in a binding request and sends the binding request to the authentication apparatus 501.

In step 4, the authentication apparatus 501 receives the binding request sent by the access apparatus 503.

In step 5, the authentication apparatus 501 identifies the first identification feature and account information associated with the client terminal based on the binding request.

In step 6, the authentication apparatus 501 generates a mapping relationship between the first identification feature and the account information of the client terminal and stores the mapping relationship in a SASL database.

In step 7, the access apparatus 503 obtains a second identification feature of the client terminal.

In step 8, the access apparatus 503 generates a login request based on the second identification feature of the client terminal and sends the login request to the server, where the login request includes the account information associated with the client terminal.

In step 9, the authentication apparatus 501 receives the login request from the client terminal, where the login request includes the account information associated with the client terminal.

In step 10, the authentication apparatus 501 marks the authentication status of the data packets and login request as pending authentication.

In step 11, the authentication apparatus 501 identifies the second identification feature and account information associated with the client terminal based on the login request.

In step 12, the authentication apparatus 501 determines whether the database of the server includes an identification feature and account information matching the second identification feature and account information identified in step 11.

In step 13, the authentication apparatus 501 modifies the authentication status of the received data packets and login request to authenticated.

In step 14, the authentication apparatus 501 performs processing operations on the received data packets.

In step 15, the authentication apparatus 501 sends, to the access apparatus 503, login status information generated based on the determination result of step 12.

In step 16, the access apparatus 503 receives the login status information.

In step 17, if the login status information indicates a login success, the authentication apparatus 501 initiates data communications with the access apparatus 503.

In step 18, if the login status information indicates a login success, the access apparatus 503 initiates data communications with the authentication apparatus 501.

In step 19, if the login status information indicates a login success, the authentication apparatus 501 marks the authentication status of subsequent data packets received from the client terminal as authenticated.

The authentication process may include additional steps or omit certain steps described above without departing from the spirit of the present disclosure. For example, steps 1-6, 10, 13, 14, and/or 19 may be omitted in some implementations.

Figure 6:
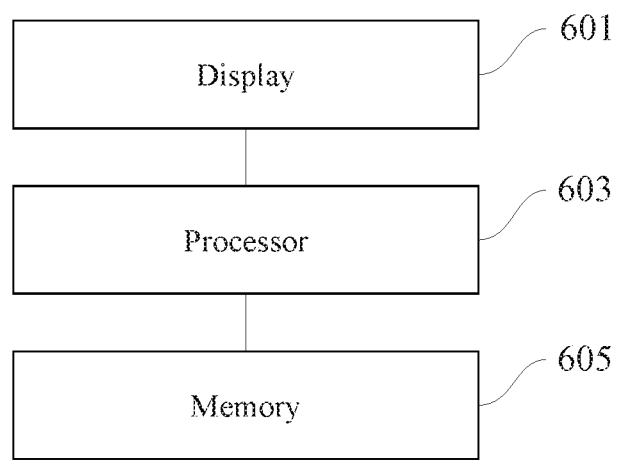
FIG. 6 is a block diagram of an exemplary electronic device, consistent with some embodiments of this disclosure.

FIG. 6 is a block diagram of an exemplary electronic device 600, consistent with some embodiments of this disclosure. The electronic device 600 may be implemented as a server or a client terminal described above. Referring to FIG. 6, the electronic device 600 includes a display 601, a processor 603, and a memory 605. In exemplary embodiments, the electronic device 600 may include input/output interfaces and network interfaces.

The memory 605 may store instructions, such as an authentication program, and the instructions, when executed by the processor to read, may perform the above-described methods, such as methods 100 and 300. The memory 605 may include a computer-readable medium, a random access memory (RAM), and/or other forms of nonvolatile memory, such as read only memory (ROM) or flash RAM.

In exemplary embodiments, there is also provided a non-transitory computer-readable storage medium including instructions, such as included in the memory 605, executable by the processor 603 in the electronic device 600, for performing the above-described methods. For example, the non-transitory computer-readable storage medium may be a ROM, a phase change memory (the PRAM), static random access memory (SRAM), dynamic random access memory (DRAM), other types of random access memory (RAM), read-only memory (ROM), electrically erasable programmable read-only memory (EEPROM), flash memory or other memory technology, a cache, a register, CD-ROM, digital versatile disk (DVD), or other optical storage, magnetic cassettes, magnetic tape, or other magnetic disk storage devices.

One of ordinary skill in the art will understand that the above-described embodiments can be implemented by hardware, software, or a combination of hardware and software. If implemented by software, it may be stored in the above-described computer-readable medium. The software, when executed by the processor can perform the disclosed methods. The computing units and the other functional units described in this disclosure can be implemented by hardware, or software, or a combination of hardware and software. One of ordinary skill in the art will also understand that multiple ones of the above-described units may be combined as one unit, and each of the above-described modules/units may be further divided into a plurality of sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. An authentication method, comprising:
   receiving, at a server, a binding request from a client terminal before receiving a login request;
   identifying an identification feature of the client terminal and account information associated with the client terminal based on the binding request, wherein the identification feature is obtained by the client terminal when the client terminal receives an input from a user, the input including the account information, and the identification feature includes an Internet Protocol (IP) address of the client terminal;
   generating, at the server, a mapping relation between the identification feature and the account information;
   receiving one or more data packets sent by the client terminal;
   marking an authentication status of the data packets and the login request as pending authentication;
   receiving, at the server, the login request from the client terminal, wherein the login request is generated based on the identification feature of the client terminal, and the login request includes the account information associated with the client terminal;
   identifying the identification feature based on the login request;
   determining whether a database associated with the server includes the identification feature and the account information;
   when it is determined that the database includes the identification feature and the account information, modifying the authentication status of the data packets and the login request as authenticated;
   generating login status information based on a result of the determination and sending the login status information to the client terminal; and
   in response to the login status information indicating a login success of the client terminal, initiating data communications with the client terminal.

2. The authentication method of claim 1, wherein determining whether a server database includes the identification feature and the account information comprises:
   searching for the identification feature in the database;
   identifying corresponding account information in the database based on the identification feature and a mapping relation; and
   determining whether the corresponding account information is identical to the account information.

3. The authentication method of claim 1, further comprising:
   after initiating the data communications with the client terminal, marking an authentication status of one or more subsequent data packets received from the client terminal as authenticated.

4. An authentication apparatus, comprising:
   a binding request receiving unit configured to receive, at a server, a binding request from a client terminal before receiving the login request;
   a binding request identification unit configured to identify an identification feature of the client terminal and account information associated with the client terminal based on the binding request, wherein the identification feature is obtained by the client terminal when the client terminal receives an input from a user, the input including the account information, and the identification feature includes an Internet Protocol (IP) address of the client terminal;
   a mapping unit configured to generate, at the server, a mapping relation between the identification feature and the account information;
   a receiving unit configured to:
      receive, at the server, the login request from the client terminal, wherein the login request is generated based on the identification feature of the client terminal, and the login request includes the account information associated with the client terminal; and
      receive one or more data packets sent by the client terminal;
      wherein the receiving unit further comprises a first status marking sub-unit configured to mark an authentication status of the data packets and the login request as pending authentication;
   an identification unit configured to identify the identification feature based on the login request;
   a determination unit configured to determine whether a database associated with the server includes the identification feature and the account information;
   a status modifying unit configured to, if it is determined that the database includes the identification feature and the account information, modify the authentication status of the data packets and the login request as authenticated;
   a processing sub-unit configured to perform one or more processing operations on the data packets after modifying the authentication status of the data packets and the login request as authenticated;
   a generating unit configured to, generate login status information based on a result of the determination and send the login status information to the client terminal; and
   an establishing unit configured to, if the login status information indicates a login success of the client terminal, initiate data communications with the client terminal.

5. The authentication apparatus of claim 4, wherein the determination unit is further configured to:
   search for the identification feature in the database;
   identify corresponding account information in the database based on the identification feature and a mapping relation; and
   determine whether the corresponding account information is identical to the account information.

6. The authentication apparatus of claim 4, further comprising a second status marking unit configured to:
   after initiating the data communications with the client terminal, mark an authentication status of one or more subsequent data packets received from the client terminal as authenticated.

7. A method for accessing a server, comprising:
   obtaining an identification feature of a client terminal when the client terminal receives an input from a user, the input including account information associated with the client terminal, wherein the identification feature includes an Internet Protocol (IP) address of the client terminal;

including the identification feature of a client terminal and the account information associated with the client terminal in a binding request and sending the binding request to the server, wherein the server generates a mapping relation between the identification feature and the account information based on the binding request;

obtaining the identification feature of the client terminal after sending the binding request;

generating a login request based on the identification feature and sending the login request to the server, wherein the login request includes the account information associated with the client terminal;

sending one or more data packets to the server, wherein an authentication status of the data packets and the login request are marked as pending authentication;

receiving login status information from the server, wherein the login status information is generated by the server based on the login request, and wherein the authentication status of the data packets and the login request are modified as authenticated; and in response to the login status information indicating a login success of the client terminal, initiating data communications with the server.

8. The method of claim 7, wherein the login request is sent to the server in a data message based on an application layer protocol.

9. The method of claim 8, wherein the application layer protocol is a connection-based protocol.

10. The method of claim 9, wherein the application layer protocol is a Transmission Control Protocol (TCP).

11. The method of claim 7, further comprising:
receiving the account information input in the client terminal before obtaining the identification feature; and
acquiring the identification feature when receiving the account information input in the client terminal.

12. An apparatus for accessing a server, comprising:
a memory storing a set of instructions; and
a processor configured to execute the set of instructions to cause the apparatus to perform:
obtaining an identification feature of a client terminal when the client terminal receives an input from a user, the input including account information associated with the client terminal, wherein the identification feature includes an Internet Protocol (IP) address of the client terminal;
including an identification feature of a client terminal and account information associated with the client terminal in a binding request and send the binding request to the server, wherein the server generates a mapping relation between the identification feature and the account information based on the binding request;
obtaining the identification feature of the client terminal;
generating a login request based on the identification feature and send the login request to the server, wherein the login request includes the account information associated with the client terminal;
sending one or more data packets to the server, wherein an authentication status of the data packets and the login request are marked as pending authentication;
receiving login status information from the server, wherein the login status information is generated by the server based on the login request, and wherein the authentication status of the data packets and the login request are modified as authenticated; and
if the login status information indicates a login success of the client terminal, initiating data communications with the server.

13. The apparatus of claim 12, wherein the processor is further configured to execute the set of instructions to cause the apparatus to send the login request to the server in a data message based on an application layer protocol.

14. The apparatus of claim 13, wherein the application layer protocol is a connection-based protocol.

15. The apparatus of claim 14, wherein the application layer protocol is a Transmission Control Protocol (TCP).

16. The apparatus of claim 12, wherein the processor is further configured to execute the set of instructions to cause the apparatus to perform:
receiving the account information input in the client terminal before obtaining the identification feature; and
acquiring the identification feature when receiving the account information input in the client terminal.

17. An electronic device, comprising:
a display;
a processor; and
a memory configured to store instructions executable by the processor;
wherein the processor is configured to execute the instructions to cause the electronic device to:
receive a binding request from a client terminal before receiving a login request;
identify an identification feature of the client terminal and account information associated with the client terminal based on the binding request, wherein the identification feature is obtained by the client terminal when the client terminal receives an input from a user, the input including the account information, and the identification feature includes an Internet Protocol (IP) address of the client terminal;
generate a mapping relation between the identification feature and the account information;
receive one or more data packets sent by the client terminal;
mark an authentication status of the data packets and the login request as pending authentication;
receive the login request from the client terminal, wherein the login request is generated based on the identification feature of the client terminal, and the login request includes the account information associated with the client terminal;
determine whether a database of a server includes the identification feature and the account information;
when it is determined that the database includes the identification feature and the account information, modify the authentication status of the data packets and the login request as authenticated;
perform one or more processing operations on the data packets after modifying the authentication status of the data packets and the login request as authenticated;
generate login status information based on a result of the determination and send the login status information to the client terminal; and
if the login status information indicates a login success of the client terminal, initiate data communications with the client terminal.

18. A non-transitory computer readable medium that stores a set of instructions that is executable by at least one processor of a server to cause the server to perform an authentication method, the authentication method comprising:
receiving, at the server, a binding request from a client terminal before receiving a login request;
identifying an identification feature of the client terminal and account information associated with the client terminal based on the binding request, wherein the identification feature is obtained by the client terminal when the client terminal receives an input from a user, the input including the account information, and the identification feature includes an Internet Protocol (IP) address of the client terminal;

generating, at the server, a mapping relation between the identification feature and the account information;

receiving one or more data packets sent by the client terminal;

marking an authentication status of the data packets and the login request as pending authentication;

receiving the login request from the client terminal, wherein the login request is generated based on the identification feature of the client terminal, and the login request includes the account information associated with the client terminal;

determining whether a database of the server includes the identification feature and the account information;

when it is determined that the database includes the identification feature and the account information, modifying the authentication status of the data packets and the login request as authenticated;

performing one or more processing operations on the data packets after modifying the authentication status of the data packets and the login request as authenticated;

generating login status information based on a result of the determination and send the login status information to the client terminal; and if the login status information indicates a login success of the client terminal, initiating data communications with the client terminal.

19. The non-transitory computer readable medium apparatus of claim 18, wherein the set of instructions that is executable by the at least one processor of the server to cause the server to further perform:

searching for data matching the identification feature in the database;

identifying corresponding account information in the database based on the identification feature and a mapping relationship; and determining whether the corresponding account information matches the account information.

* * * * *